US010645790B2

(12) United States Patent
Bassi

(10) Patent No.: US 10,645,790 B2

(45) Date of Patent: May 5, 2020

(54) LINK DEVICE OF A PLASMA TORCH

(71) Applicant: TEC. MO S.R.L., Pianoro (IT)

(72) Inventor: Giorgio Bassi, Pianoro (IT)

(73) Assignee: TEC. MO S.R.L. (IT)

( * ) Notice: Subject to any disclaimer, the term of this patent is extended or adjusted under 35 U.S.C. 154(b) by 263 days.

(21) Appl. No.: 15/810,888

(22) Filed: Nov. 13, 2017

(65) Prior Publication Data

US 2018/0376576 A1 Dec. 27, 2018

(30) Foreign Application Priority Data

Jun. 26, 2017 (IT) ........................ 102017000071187

(51) Int. Cl.
*B23K 10/00* (2006.01)
*H05H 1/34* (2006.01)

(52) U.S. Cl.
CPC ....... *H05H 1/34* (2013.01); *H05H 2001/3473* (2013.01)

(58) Field of Classification Search
CPC .... H05H 1/34; H05H 1/36; H05H 2001/3473; H05H 1/26
USPC .............. 219/121.51, 121.5, 121.52, 121.39, 219/121.45, 121.48, 75
See application file for complete search history.

(56) References Cited

U.S. PATENT DOCUMENTS

| | | | |
|---|---|---|---|
| 3,022,484 A | 2/1962 | Thompson, Jr. | |
| 2017/0033484 A1 | 2/2017 | Ferrier | |
| 2017/0187158 A1* | 6/2017 | Crowe .................. | H01R 43/26 |

FOREIGN PATENT DOCUMENTS

| | | |
|---|---|---|
| EP | 1982788 | 10/2008 |
| FR | 2721440 | 12/1995 |
| WO | 03041459 | 5/2003 |
| WO | 2009105511 | 8/2009 |

OTHER PUBLICATIONS

Italian Search Report Application No. IT201700071187 dated Feb. 14, 2018 10 pages.

* cited by examiner

*Primary Examiner* — Mark H Paschall
(74) *Attorney, Agent, or Firm* — Ware, Fressola, Maguire & Barber LLP

(57) ABSTRACT

A link device (1) for a plasma torch and/or welding system has a connector (2) for engaging into a housing (3) of a feeder. The device (1) includes a safety key (4) that, in a link condition of the device in which the connector (2) is engaged in the housing (3), assigned to be housed at least partially in a respective space between the external wall of the connector (2) and the internal wall of housing (3); such key (4) is equipped with first stop means (5) which, in the link condition, matches with second stop means (6) of housing (3) avoiding the disengagement of the key (4) from housing (3); key (4) and connector (2) are respectively provided with first connection means (7) and with second connection means (9) for a removable blocking means (8) to block the connector (2) to key (4) and then to housing (3).

8 Claims, 3 Drawing Sheets

LINK DEVICE OF A PLASMA TORCH

BACKGROUND

The present invention concerns plasma torches for industrial and mechanical applications and it refers to a link device of a plasma torch, welding torch and the like, for example for manual applications, particularly suitable for removably connecting the torch power cord to a respective power supply unit.

Plasma torch connectors, welding torches and the like (hereinafter briefly referred as torch or plasma torch) are known to be connected by a feeding cable to a power supply means for feeding the torch with fluids, such as air, other gases and possibly water where such known connectors allow the connection and detachment of one cable end from the feeding means. Such known connectors include a blocking means assigned to engage with a respective housing of feeding means. The known locking device includes a button, which, if it is operated by a user, causes the disengagement of blocking means from the housing of feeding means and thus the separation of cable and torch from the power means. The housing includes, for example, a central duct, configured to carry a fluid and an electric current for a torch, and a plurality of electrical connections radially disposed with respect to central duct; wherein at least one electric conductor is configured to carry a pilot current.

A disadvantage of such connecting devices for known torches is that accidental disengagements of connector may occur with respect to feeding means.

SUMMARY

An object of the present invention is to propose a link device for plasma torch and/or other cutting or welding systems fit for ensuring a durable and secure connection between connector and feeding means and the possibility of an easy detachment thereof. According to the present invention, a link device for plasma torch and/or or welding systems having a connector for engaging into a housing of a feeding means and having at least one link to provide fluids to the torch and a plurality of electrical connections for said torch; said device characterized in that it comprises a safety key assigned, in a link condition of the device in which the connector is engaged in the housing, to be housed at least partially in a respective space between the external wall of the connector and the internal wall of housing; such key is equipped with first stop means which, in said link condition, matches with second stop means of housing avoiding the disengagement of the key from housing; key and connector are respectively provided with first connection means and with second connection means for a removable blocking means assigned, in said link condition, to block the connector to key and then to housing.

BRIEF DESCRIPTION OF THE DRAWINGS

The features of the invention are highlighted in the following, with particular reference to the accompanying drawings, in which.

DETAILED DESCRIPTION

Figure 1:
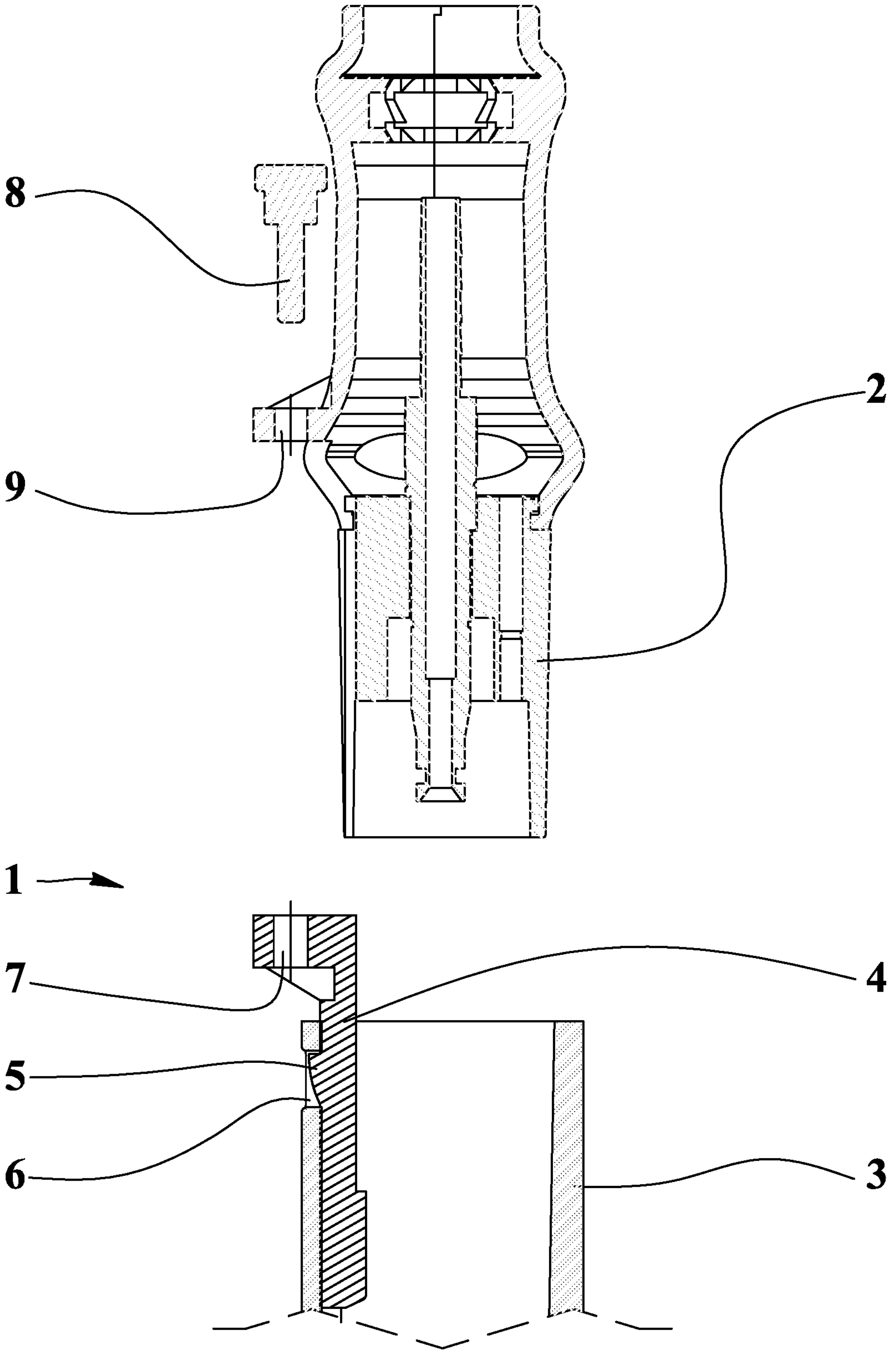
FIG. 1 shows a sectional view of an axial plane of a plasma torch device of the present invention in a detached condition of the torch cable connector from a housing of feeding means.
Figure 2:
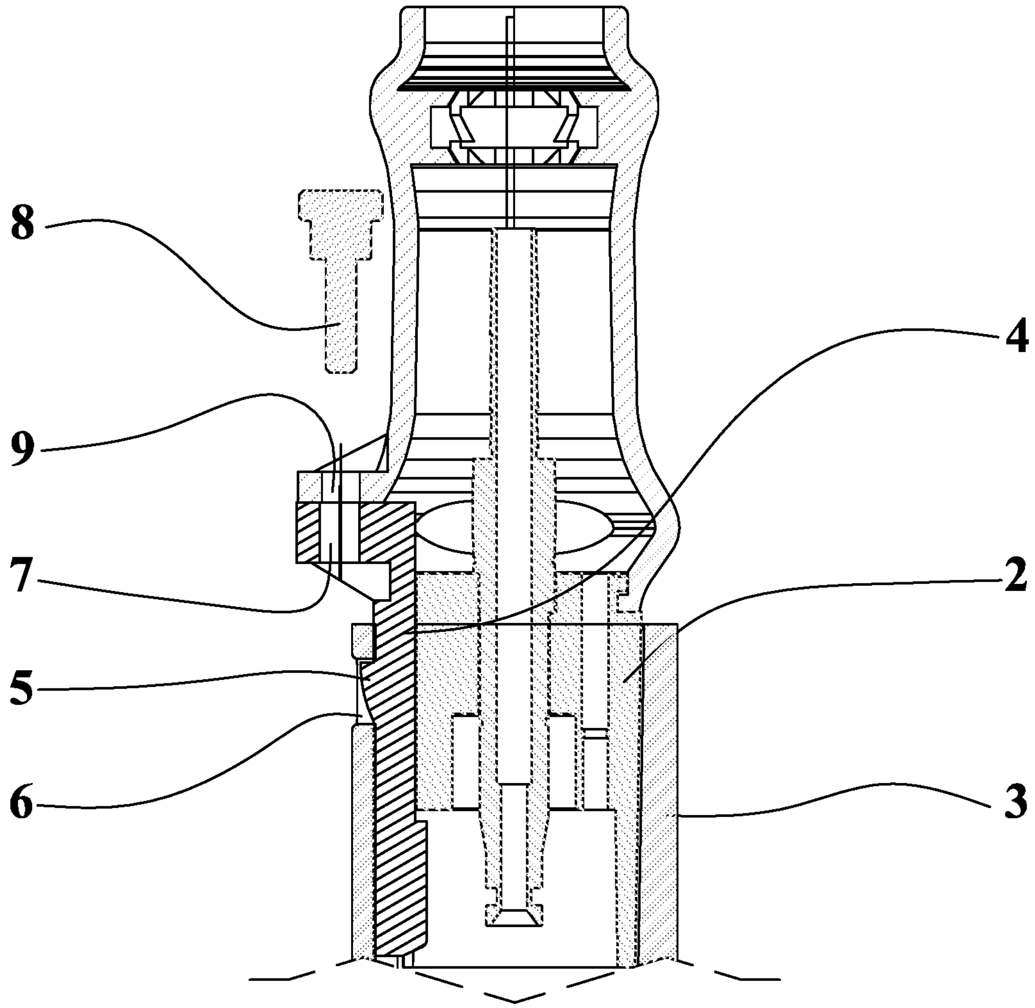
FIG. 2 shows a view of the device of FIG. 1 in a clamped condition.
Figure 3:
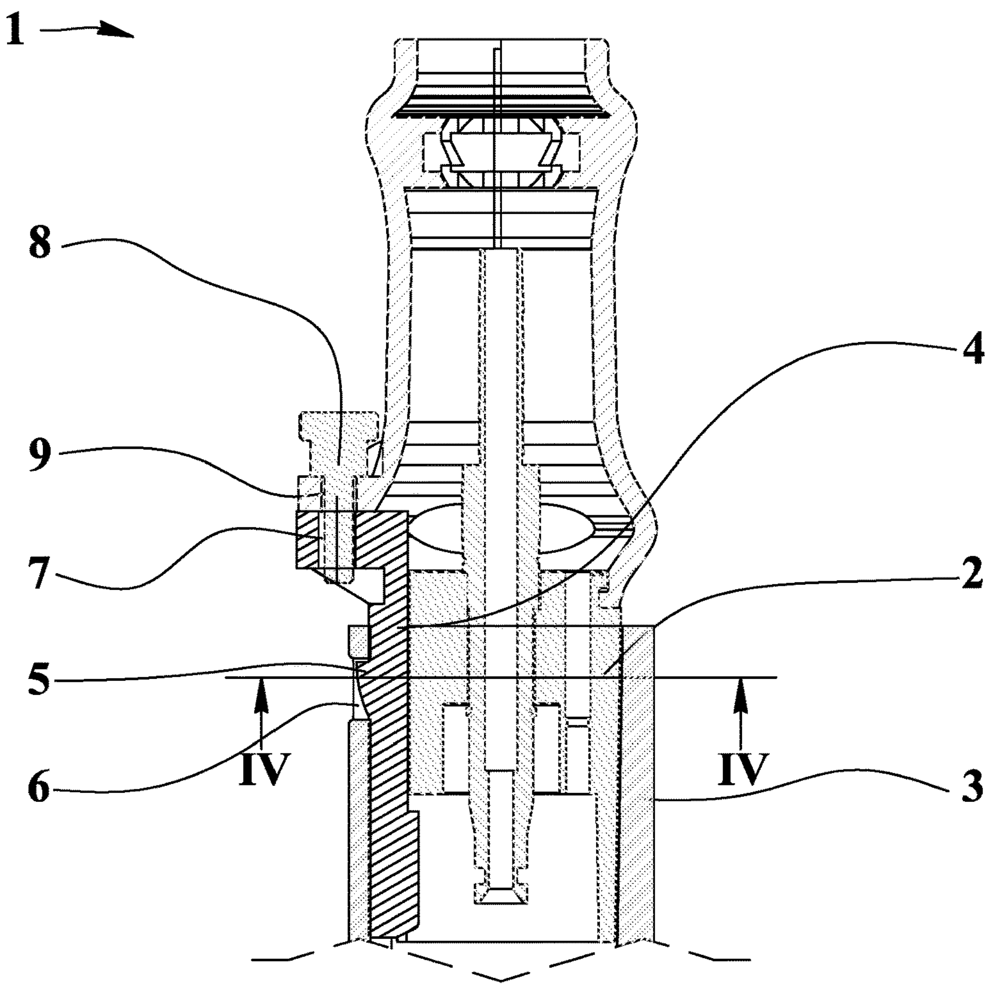
FIG. 3 shows a view of the device of FIG. 1 in a linked condition.
Figure 4:
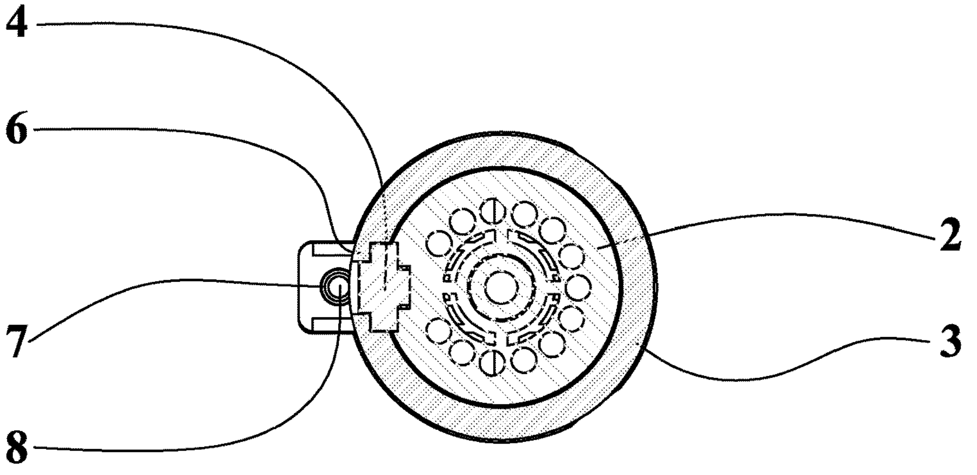
FIG. 4 shows a sectional view according to plane IV-IV of device of FIG. 3.

With reference to FIGS. 1-4, numeral 1 indicates the link device for plasma torch and/or welding systems of the present invention.

The link device for plasma torch and/or welding systems and the like has a connector 2 assigned for engaging into a housing 3 of a static or portable power supply. Such housing 3 provides at least one link to provide fluids to a torch and a plurality of electrical connections for said torch, of which at least one is for a pilot spark.

Said device comprises a security or safety key 4, in a linked condition of the device in which the connector 2 is engaged into housing 3, to be housed at least partially in a respective space between an outer wall of connector 2 and an inner wall of housing 3. This security key 4 is provided with first stop means 5 which, in said link condition, matches with second stop means 6 of housing 3 so preventing the disengagement of key 4 from housing 3.

The key 4 and the connector 2 are respectively provided with first connection means 7 and second connection means 9 for a removable blocking means 8, in said linked condition, to lock connector 2 to key 4 and then to housing 3.

In the preferred embodiment, the connection means, first 7 and second 9, are through holes, one of which can be threaded, suitable for engaging the blocking means 8, which is a bolt with a threaded end and a head with a head or preferably a handle or knob designed to match the edge of an arm or bracket around the second connection means 9. The threaded portion of blocking means 8 engages and screws into a threaded hole in at least the first connection means 7 and possibly the second connection means 9 too, or possibly with a nut to tighten each other and reversibly lock the security key 4 to the connector 2.

The second stop means 6 has a recess or open slot for first stop means 5 consisting of a protrusion or a tooth, or vice versa; such protrusion or tooth being made in a single body with connector 2 or rigidly fixed thereto.

A simple variant of stop means 5, whose understanding does not require specific figures, provides that tooth is connected to key 4 in a mobile way, for example by an elastic element, thus allowing the key 4 to be connected to connector 2 and then inserting the set into the housing 3, then to release them, then blocking means 8 must be unlocked, connector 2 is pulled out and then key 4 is pulled out.

A simple variant, whose understanding does not require specific figures, provides that the blocking means 8 has an elastic element at the opposite end of the head, which, in a blocking condition, prevents removing of key 4 from connector 2.

Preferably, the safety key 4 comprises a body, preferably made of a plastic material, resin or metal, shaped as an extended parallelepiped with first stop means 5 and having a protrusion at one end in which may be carried out as the first connection means 7. The connector 2 is equipped with an extruding arm or bracket with second connection means 9.

The key 4 is positioned in a recess of connector 2 and/or in a hollow of housing 3. Preferably such recess for key 4 is carried out in connector 2 and in housing 3 and it houses the key with a small clearance acting as a guide for a correct coupling. Obviously the radial clearance is very small between housing 3 and connector 2 when coupled, however it is smaller than a fraction of protrusion or tooth of first stop means 5.

A further simple variant, the understanding of which does not require specific figures, provides that connection means, first 7 and second 9, consists of respective seats intended to be engaged by blocking means 8 shaped as clamp, clip or the like.

An advantage of the invention is to provide a linking device for a plasma torch to ensure a durable and secure connection between a connector and a power supply and the possibility of easy detachment of the same.

The invention claimed is:

1. Link device for plasma torch or welding systems having a connector (2) for engaging into a housing (3) of a feeding means and having at least one link to provide fluids to the torch and a plurality of electrical connections for said torch; said link device (1) comprises a safety key (4) assigned, in a linked condition of the device in which the connector (2) is engaged in the housing (3) at least partially in a respective space between the external wall of the connector (2) and the internal wall of housing (3); such key (4) is equipped with first stop means (5) that, in said linked condition, matches with second stop means (6) of housing (3) to avoid disengagement of the key (4) from housing (3); key (4) and connector (2) are respectively provided with first connection means (7) and with second connection means (9) for a removable blocking means (8) assigned, in said linked condition, to block the connector (2) to key (4) and then to housing (3), wherein the key (4) is housed with small clearance in a recess of hollow carried out in the connector (2) and in the housing (3), and wherein the recess of hollow for the key (4) acts as a guide for correct coupling.

2. Device according to claim 1, wherein the second stop means (6) has a recess or a slot for first stop means (5) consisting of a protrusion or a tooth, or vice versa.

3. Device according to claim 1, wherein the safety key (4) comprises an extended parallelepiped having the first stop means (5) and one end has a protrusion in which the first connection means (7) is carried out.

4. Device according to claim 1, wherein the connector (2) is equipped with a protruding arm or bracket having the second connection means (9).

5. Device according to claim 1, wherein each of the connection means (7, 9) consists of a through hole and/ or a threaded hole assigned to be engaged by the blocking means (8) with a bolt or screw shape with the threaded end engaged into the threaded hollow or into a nut.

6. Device according to claim 5, wherein the blocking means (8) has a threaded stem assigned to engage with a female screw of first connection means (7), and a head equipped with a possible knob assigned to match with the edge of the arm or bracket around the second connection means (9).

7. Device according to claim 1, wherein the connection means (7, 9) consists of respective seats assigned to be engaged by blocking means (8) with a clamp shape, clip or the like.

8. Device according to claim 1, wherein the key (4) is made of a plastic material, resin or metal.

* * * * *